(12) United States Patent
Kanbara

(10) Patent No.: US 6,211,607 B1
(45) Date of Patent: Apr. 3, 2001

(54) ACTUATOR USING ELECTRO-MECHANICAL TRANSDUCER

(75) Inventor: Tetsuro Kanbara, Takaishi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/361,403

(22) Filed: Jul. 27, 1999

(30) Foreign Application Priority Data

Jul. 28, 1998 (JP) .................................................. 10-226597

(51) Int. Cl.⁷ ...................................................... H02N 2/00
(52) U.S. Cl. ..................................... 310/328; 310/323.01
(58) Field of Search ............................... 310/323.01, 328

(56) References Cited

U.S. PATENT DOCUMENTS 4,857,793 * 8/1989 Okuno .................................... 310/328
5,589,723 12/1996 Yoshida et al. ....................... 310/328

* cited by examiner

Primary Examiner—Thomas M. Dougherty
(74) Attorney, Agent, or Firm—McDermott, Will & Emery

(57) ABSTRACT

An actuator using an electro-mechanical transducer, the actuator comprising: the electro-mechanical transducer; a fixed portion securely coupled to one end of the electro-mechanical transducer to securely hold the electro-mechanical transducer; a driving member securely coupled to the other end of the electro-mechanical transducer to be displaced together with the electro-mechanical transducer; a member to be driven which is frictionally coupled to the driving member; and a support member for supporting one end of the driving member such that the driving member is movable in the direction of expansive or contractive displacement of the electro-mechanical transducer, wherein reciprocal vibrations are produced at different speeds in the driving member by causing the expansive or contractive displacement with the application of a drive pulse to the electro-mechanical transducer such that the member to be driven that is frictionally coupled to the driving member is thereby moved in a specified direction, and one end of the driving member is adhered to the support member with an adhesive agent having viscoelasticity.

11 Claims, 7 Drawing Sheets

ACTUATOR USING ELECTRO-MECHANICAL TRANSDUCER

This application is based on application No. Hei 10-226597 filed in Japan, the content of which is hereby incorporated by reference.

FIELD OF THE INVENTION

The present invention relates to an actuator using an electro-mechanical transducer suitable for driving typical precision machinery including an X-Y drive table, a lens for a camera, a projection lens for an overhead projector, a lens for a binocular, and a probe for medical equipment.

DESCRIPTION OF THE RELATED ART

To drive an X-Y drive table, a lens for a camera, and the like, there has conventionally been used an actuator using an electric motor. However, the device has been increased in size and such drawbacks as the occurrence of a magnetic field and noise production have been reported. As means for solving the variety of problems, the present applicant has proposed an actuator using an electro-mechanical transducer, i.e., an actuator wherein a moving member is coupled frictionally to a driving member that has been coupled securely to the electro-mechanical transducer. A drive pulse with a sawtooth waveform is applied to the electro-mechanical transducer to cause displacements at different speeds in the direction of expansion or contraction, thereby causing the driving member to move the moving member frictionally coupled thereto in a specified direction (U.S. Pat. No. 5,589,723).

FIGS. 9 and 10 show an example of the foregoing actuator using the electro-mechanical transducer, of which FIG. 9 is a perspective view showing the actuator in disassembled state and FIG. 10 is a perspective view showing the actuator in assembled state.

In FIGS. 9 and 10, the actuator 100 is composed of: a holding member 101; a piezoelectric element 110 which is a type of electro-mechanical transducer; a drive shaft 111; a slider 112; and other members.

The holding member 101 is formed as a whole into a generally cylindrical configuration. First and second holes 102 and 103 are formed in the holding member 101 to extend therethrough in the diametrical direction (vertical direction in FIG. 9). A wall portion 104 located between the holes 102 and 103 is formed with a bearing 104a for supporting the drive shaft 111. On the other hand, the portion of the holding member 101 corresponding to an end face thereof and composing the wall portion 105 of the hole 103 is formed with a bearing 105a for supporting the drive shaft 111. The holding member has a portion 106 as a mounting portion for mounting the actuator to equipment.

The piezoelectric element 110 is disposed in the first hole 102 to have one end secured adhesively to the wall face of the holding member 101 closer to the mounting portion 106 and the other end secured adhesively to the drive shaft 111. The drive shaft 111 secured adhesively to the piezoelectric element 110 can reciprocate in the axial direction when the piezoelectric element 110 undergoes an expansive or contractive displacement in the direction of thickness, since the drive shaft 111 is supported by the respective bearings 104a and 105a of the wall portions 104 and 105.

The slider designated at 112 is disposed in the hole 103 of the holding member 101 to be movable in the direction of the cylindrical axis within the hole 103, while using the longitudinal inner wall face composing the wall 103 as a detent and guide. The lower portion of the slider 112 is provided with a member to be driven by the actuator 100, e.g., a mounting portion 112c for the mounting of, e.g., a movable lens barrel if in a lens system.

The main body portion of the slider 112 is formed with a hole 112a through which the drive shaft 111 extends, while the portion of the slider 112 overlying the drive shaft 111 extending through the hole 112a is formed with an opening 112b, in which the upper half of the drive shaft 111 is exposed. A pad 113 for abutting on the upper half of the drive shaft 111 is fitted in the opening 112b. The upper part of the pad 113 is provided with a projection 113a, while the bottom surface thereof is provided with a groove 13b for abutting on the upper half of the drive shaft 111. The groove 113b of the pad 113 abuts on the drive shaft 111 with the projection 113a of the pad 113 being pressed down by a plate spring 114, whereby a downward biasing force is applied. Screws for securing the plate spring 114 to the slider 112 are designated at 115.

With the structure, the drive shaft 111, the pad 113, and the slider 112 are frictionally coupled to each other under a proper frictional coupling force. The biasing force F which determines the frictional coupling force can be adjusted by moderating the tightening of the screws 115.

As described above, the drive shaft 111 is supported by the respective bearings 104a and 105a of the wall portions 104 and 105 and has an end portion 111a on the opposite side of the piezoelectric element 110 slightly protruding from within the hole of the bearing 105a.

A plate spring 117 is secured to the outer side of the wall portion 104 with screws 118 to axially press the end portion 111a of the drive shaft 111. The pressing force can be adjusted by moderating the tightening of the screws 118.

A description will be given next to the operation. When a sawtooth wave drive pulse having a slow rising portion and a rapid falling portion, as shown in FIG. 11A, is initially applied to the piezoelectric element 110, the piezoelectric element 110 is displaced slowly expansively in the direction of thickness with the slow rising portion of the drive pulse. As a result, the drive shaft 111 coupled to the piezoelectric element 110 is also displaced slowly in a positive direction (direction indicated by the arrow a). At this time, the slider 112 frictionally coupled to the drive shaft 111 moves in the positive direction together with the drive shaft 111 under the frictional coupling force.

With the rapid falling portion of the drive pulse, the piezoelectric element 110 is displaced rapidly contractively in the direction of thickness, so that the drive shaft 111 coupled to the piezoelectric element 110 is also displaced rapidly in a negative direction (direction opposite to the direction indicated by the arrow a). At this time, the slider 112 frictionally coupled to the drive shaft 111 inertially overcomes the frictional coupling force so that it stays in place and does not substantially move. By continuously applying the drive pulse to the piezoelectric element 110, it becomes possible to produce reciprocal vibrations at different speeds in the drive shaft 111 and continuously move the slider 112 frictionally coupled to the drive shaft 111 in the positive direction.

In the terminology used here, "substantially" covers the case where the slider 112 moves after the drive shaft 111 with a slide occurring at a frictional coupling plane between the slider 112 and the drive shaft 111 so that the slider 112 and the drive shaft 111 move as a whole entity in the direction indicated by the arrow a due to different driving times.

The movement of the slider 112 in the direction opposite to the foregoing (direction opposite to the direction indicated by the arrow a) can be achieved by changing the waveform of the sawtooth wave drive pulse applied to the piezoelectric element 110 and applying a drive pulse consisting of a rapid rising portion and a slow falling portion, as shown in FIG. 11B.

Thus, in the conventional actuator using the electro-mechanical transducer, the piezoelectric element and the electro-mechanical transducer are secured adhesively to the holding member and to the drive shaft, respectively. Consequently, adhesion at the securely coupled portion gradually deteriorates due to vibrations transmitted from the electro-mechanical transducer during driving, which may cause such a problem as the peeling off of the securely coupled portion. To overcome the problem, a plate spring (plate sprint 117 in the conventional embodiment mentioned above) is disposed at the end portion of the drive shaft to bias the drive shaft in the direction of the electro-mechanical transducer and thereby prevent the peeling off of the adhesively secured portion.

Although the foregoing structure in which the drive shaft is biased toward the electro-mechanical transducer with the plate spring is effective in preventing the peeling off of the adhesively secured portion, however, the structure has proved to be disadvantageous in that expansive or contractive displacements caused at different speeds in the electro-mechanical transducer cannot efficiently be transmitted to the drive shaft, since biasing is performed in one direction along the axis of the drive shaft.

SUMMARY OF THE INVENTION

It is therefore an object of the present invention to solve the foregoing problem and provide an actuator using an electro-mechanical transducer and having a high driving efficiency.

One aspect of the present invention is an actuator using an electro-mechanical transducer, the actuator comprising: the electro-mechanical transducer; a fixed portion securely coupled to one end of the electro-mechanical transducer to securely hold the electro-mechanical transducer; a driving member securely coupled to the other end of the electro-mechanical transducer to be displaced together with the electro-mechanical transducer; a member to be driven which is frictionally coupled to the driving member; and a support member for supporting one end of the driving member such that the driving member is movable in the direction of expansive or contractive displacement of the electro-mechanical transducer, wherein reciprocal vibrations are produced at different speeds in the driving member by causing the expansive or contractive displacement with the application of a drive pulse to the electro-mechanical transducer such that the member to be driven that is frictionally coupled to the driving member is thereby moved in a specified direction. The actuator is characterized in that the driving member has one end adhered to the support member with an adhesive agent having viscoelasticity.

Another aspect of the present invention is an actuator using an electro-mechanical transducer, the actuator comprising: the electro-mechanical transducer; first and third members secured to the end portions in the direction of expansion or contraction of the electro-mechanical transducer; and a second member frictionally coupled to the first member, wherein reciprocal vibrations are produced at different speeds in the first member relative to the third member by causing expansive or contractive displacement with the application of a drive pulse to the electro-mechanical transducer and relative displacement is caused between the first member and the second member frictionally coupled to the first member such that either of the first and second members is thereby moved in a specified direction. The actuator is characterized in that the first member has one end adhered to a support member for supporting one end of the first member with an adhesive agent having viscoelasticity.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Below, the embodiments of the present invention will be described. The description will be given first to a first embodiment. The basic structure of the first embodiment is the same as that of the conventional actuator described above with reference to FIGS. 9 and 10, except that the structure of a holding portion at an end portion of the drive shaft is different.

Figure 1:
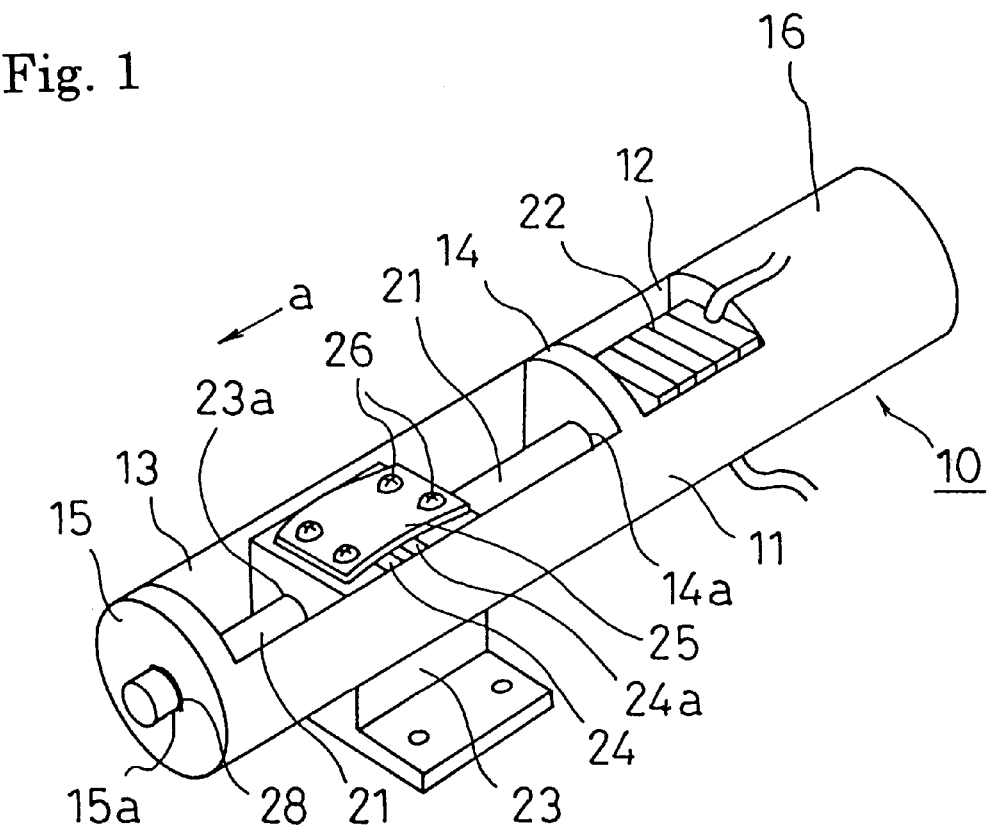
FIG. 1 is a perspective view showing a structure of an actuator according to a first embodiment of the present invention.
Figure 2:
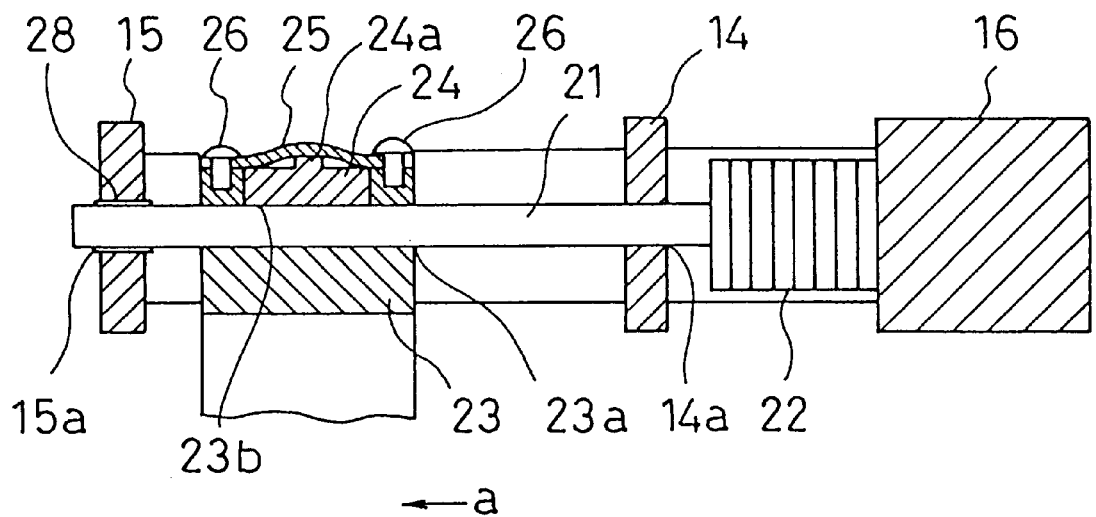
FIG. 2 is a cross-sectional view showing a structure of the principal portion of the actuator shown in FIG. 1.

FIG. 1 is a perspective view showing a structure of an actuator according to the first embodiment. FIG. 2 is a cross-sectional view showing a structure of the principal portion thereof. In FIGS. 1 and 2, the actuator is designated at 10. A holding member 11 composing a fixed portion is formed as a whole into a generally cylindrical configuration. First and second holes 12 and 13 are formed in the holding member 11 to extend therethrough in the diametrical direction (vertical direction in FIG. 1). A wall portion 14 located between the holes 12 and 13 is formed with a bearing 14a for supporting a drive shaft 21 composing a driving member. On the other hand, the portion of the holding member 11 corresponding to an end face thereof and composing the wall portion 15 of the hole 13a is formed with a bearing 15a for supporting the driving member (drive shaft). The holding member has a portion 16 as a mounting portion for the mounting of the actuator to the device.

The piezoelectric element 22 which is a type of electromechanical transducer is disposed in the first hole to have one end secured adhesively to the wall face of the holding member 11 closer to the mounting portion 16 and the other end secured adhesively to the drive shaft 21. An adhesive agent used herein is basically free from intrinsic deformation.

As shown in FIG. 2, the drive shaft 21 is supported by the bearing 14a of the wall portion 14 and by the bearing 15a of the wall portion 15. The portion of the drive shaft 21 supported by the bearing 15a is adhered to the bearing 15a with an adhesive agent 28 having viscoelasticity. As the adhesive agent having viscoelasticity, there can be used an adhesive agent containing, e.g., silicon as a main component.

A slider 23 composing a member to be driven is disposed in the hole 13 of the holding member 11 to be movable in the direction of the cylindrical axis, while using the longitudinal wall face composing the hole 13 as a detent and guide. The main body portion of the slider 23 is formed with an opening 23a through which the drive shaft 21 extends, while the portion of the slider 23 overlying the drive shaft 21 is formed with an opening 23b in which the upper half of the drive shaft 21 is exposed.

A pad 24 for abutting on the upper half of the drive shaft 24a is fitted in the opening 23b. The upper portion of the pad 24 is provided with a projection 24a. The pad 24 abuts on the drive shaft 21 with the projection 24a of the pad 24 being pressed down by a plate spring 25, whereby a downward biasing force F is applied. Screws for securing the plate spring 25 to the slider 23 are designated at 26.

With the structure, the drive shaft 21, the pad 24, and the slider 23 are frictionally coupled to each other under a proper frictional coupling force. The biasing force F which determines the frictional coupling force can be adjusted by moderating the tightening of the screws 26.

A description will be given next to the operation. When a sawtooth wave drive pulse having a slow rising portion and a rapid falling portion is initially applied to the piezoelectric element 22, the piezoelectric element 22 is displaced slowly expansively in the direction of thickness with the slow rising portion of the drive pulse. As a result, the drive shaft 21 coupled to the piezoelectric element 22 is also displaced slowly in a positive direction (direction indicated by the arrow a). At this time, the slider 23 frictionally coupled to the drive shaft 21 moves in the positive direction together with the drive shaft 21 under the frictional coupling force.

With the rapid falling portion, the piezoelectric element 22 is displaced rapidly contractively in the direction of thickness, so that the drive shaft 21 coupled to the piezoelectric element 22 is also displaced rapidly in a negative direction (direction opposite to the direction indicated by the arrow a). At this time, the slider 23 frictionally coupled to the drive shaft 21 inertially overcomes the frictional coupling force so that it stays in place and does not substantially move. By continuously applying the drive pulse to the piezoelectric element 22, it becomes possible to produce reciprocal vibrations at different speeds in the drive shaft 21 and continuously move the slider 23 frictionally coupled to the drive shaft 21 in the positive direction.

In the terminology used herein, "substantially" covers the case where the slider 23 moves after the drive shaft 21 with a slide occurring at a frictional coupling plane between the slider 23 and the drive shaft 21 so that the slider 23 and the drive shaft 21 move as a whole entity in the direction indicated by the arrow a due to different driving times.

The movement of the slider in the direction opposite to the foregoing (direction opposite to the direction indicated by the arrow a) can be achieved by changing the waveform of the sawtooth wave drive pulse applied to the piezoelectric element 22 and applying a drive pulse consisting of a rapid rising portion and a slow falling portion.

Figure 9:
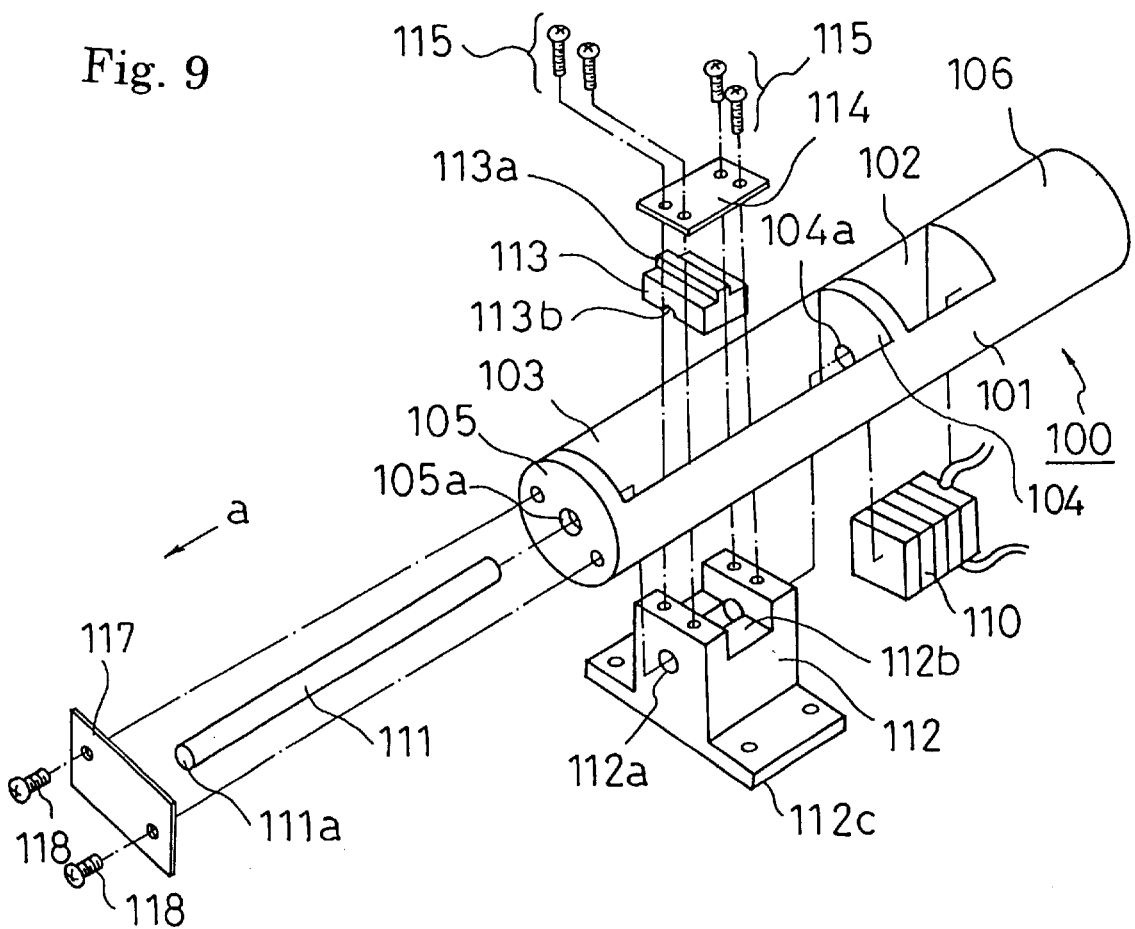
FIG. 9 is a perspective view of a conventional actuator that has been disassembled to individual components.
Figure 10:
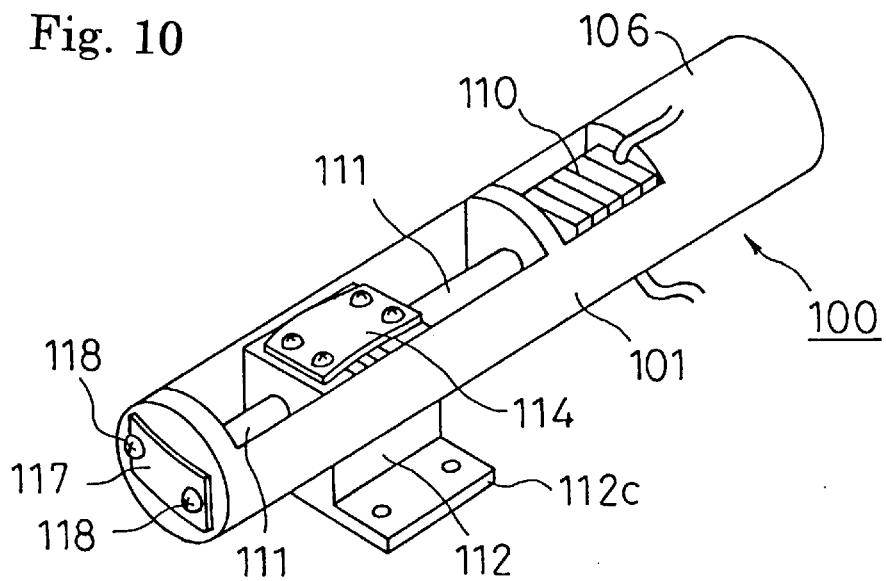
FIG. 10 is a perspective view of the conventional actuator shown in FIG. 9 when it is assembled.

The structure and operation of the actuator described above is the same as the structure and operation of the conventional actuator described with reference to FIGS. 9 and 10 except that the drive shaft 21 and the bearing 15a are adhered to each other with the adhesive agent 28 having viscoelasticity and for the following operation.

Next, a description will be given to the action and operation of the portion of the drive shaft 21 corresponding to the bearing 15a that is adhered to the bearing 15a with the adhesive agent 28 having viscoelasticity.

At the bearing 15a, the viscoelasticity of the adhesive agent 28 acts, as if as a buffer mechanism composed of a spring and a dash pot, on reciprocal vibrations at different speeds produced in the drive shaft 21 by the expansive or contractive displacement of the piezoelectric element 22 in the direction of thickness. As a result, undesired harmonic vibrations produced in the drive shaft 21 can be absorbed.

Figure 3A:
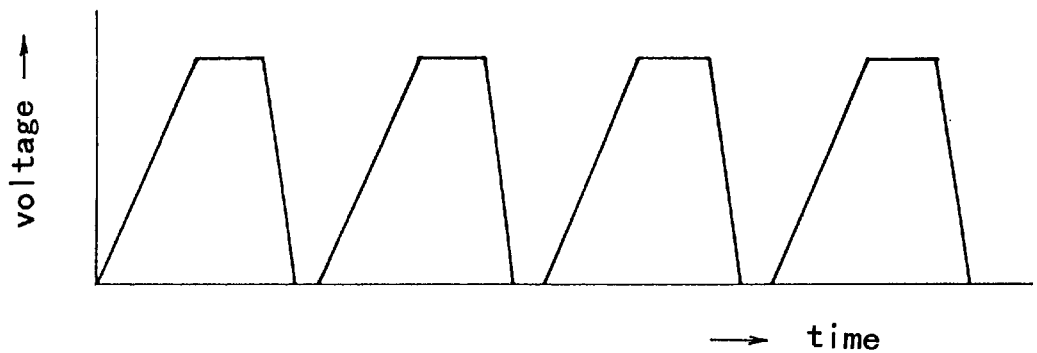
FIGS. 3A and 3B reviews for illustrating the waveform of a sawtooth wave drive pulse applied to a piezoelectric element and the displacement of a drive shaft.
Figure 3B:
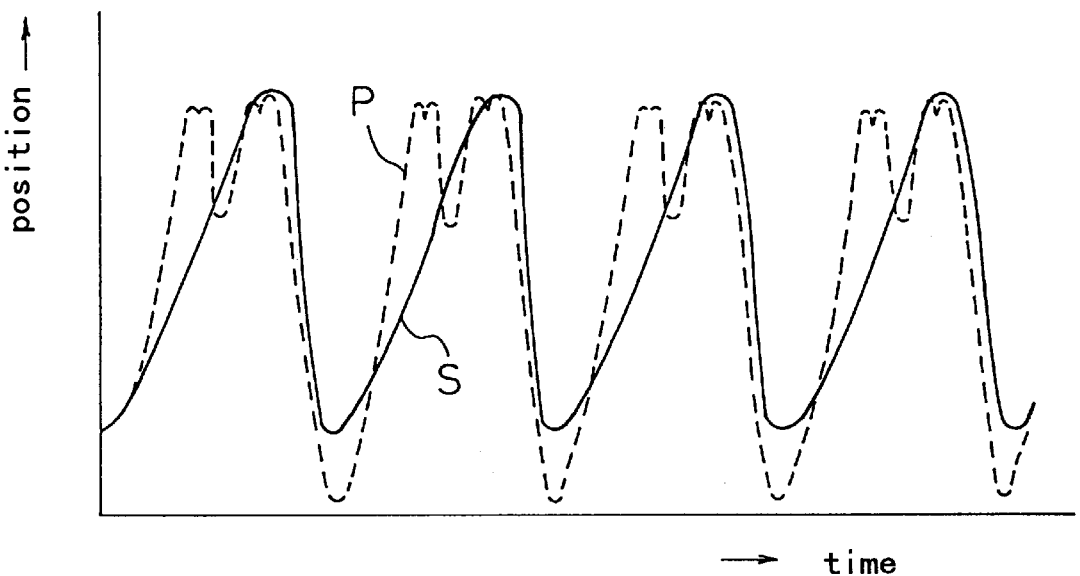

FIGS. 3A and 3B are views for illustrating the waveform of the sawtooth wave drive pulse applied to the piezoelectric element 22 and the displacement of the drive shaft. When the sawtooth wave drive pulse having a waveform as shown in FIG. 3A was applied to the piezoelectric element 22, it was proved that the harmonic vibrations produced in the drive shaft cause pulsation in the displacement of the drive shaft and there is no significant difference between the rate of expansive displacement (rising displacement) of the drive shaft relative to time and the rate of contractive displacement (falling displacement) of the drive shaft relative to time in the conventional structure in which the end of the drive shaft was pressed by the plate spring described above. This indicates a small speed difference between the reciprocal vibrations produced in the drive shaft. If the speed difference is small, the slider frictionally coupled to the drive shaft only performs reciprocal vibrations in place so that it hardly moves in a specified direction, resulting in lower driving efficiency.

When the bearing portion of the drive shaft was adhered with an adhesive, on the other hand, it was proved that the undesired harmonic vibrations produced in the drive shaft as indicated by the solid line S in FIG. 3B were absorbed and a large difference was observed between the rate of expansive displacement (rising displacement) of the drive shaft relative to time and the rate of contractive displacement (falling displacement) of the shaft relative to time. This indicates a large speed difference between the reciprocal vibrations produced in the drive shaft. Consequently, the slider frictionally coupled to the drive shaft can be moved at a high speed in a specified direction.

Figure 4:
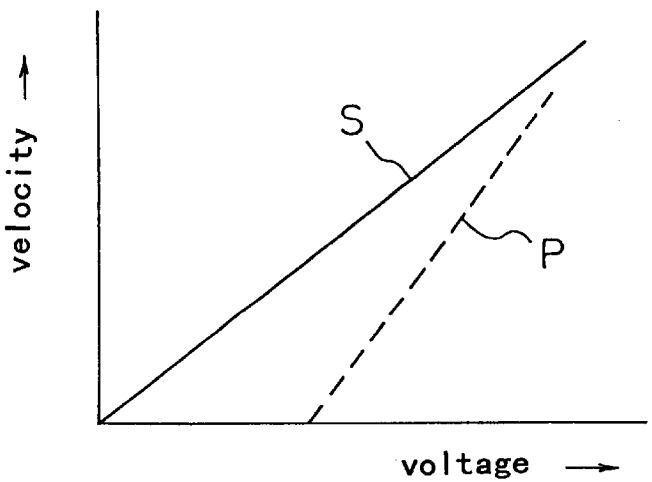
FIG. 4 is a view for illustrating the relationship between the voltage of the sawtooth wave drive pulse applied to the piezoelectric element and a speed at which a slider is driven.

FIG. 4 is a view for illustrating the relationship between the voltage of the sawtooth wave drive pulse applied to the piezoelectric element and the speed at which the slider is driven. In FIG. 4, the dot-dash line P indicates the relationship between the driving voltage and driving speed for the actuator, which has been described in the conventional embodiment. If the driving voltage is equal to or under a given voltage, the slider cannot be driven.

By contrast, it has experimentally been proved that the actuator according to the embodiment of the present invention has performance suitable for servo control, since it can be driven not only with a driving voltage lower than in the conventional embodiment but also at a high speed with a lower driving voltage and the driving speed has excellent linearity with respect to the driving voltage.

Figure 5A:
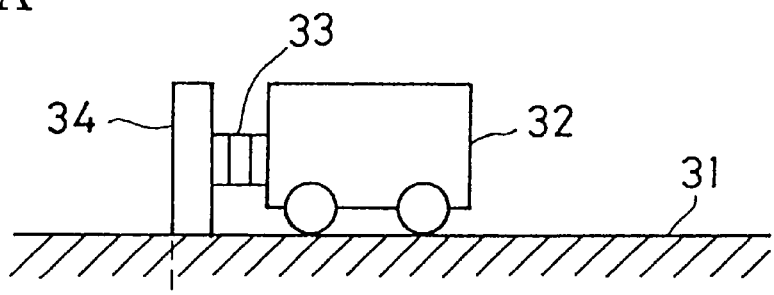
FIGS. 5A, 5B, 5C and 5D are views for illustrating the principle of driving according to a second embodiment of the present invention.
Figure 5B:
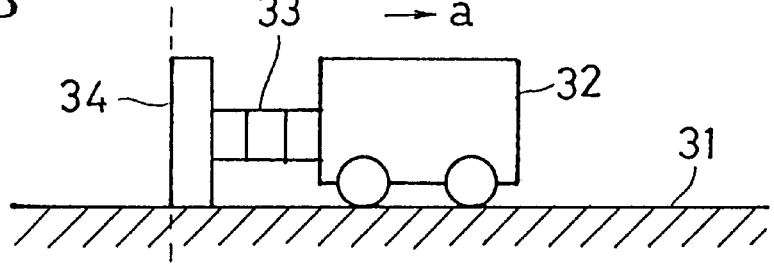
Figure 5C:
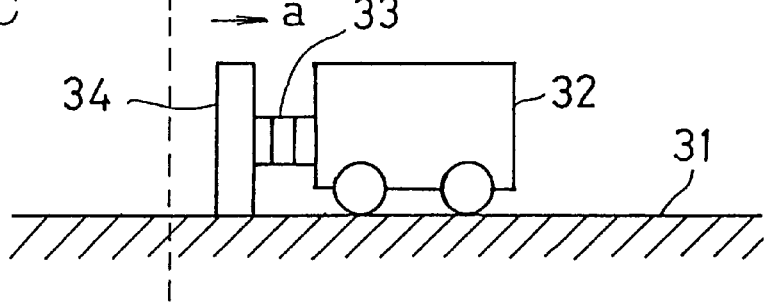

Next, a second embodiment will be described. The second embodiment is a freerunning actuator. A description will be given first to the principle of driving with reference to FIGS. 5A, 5B, 5C, and 5D. In FIGS. 5A to 5C, a moving member 32 with a mass ml and a driving fictional member 34 with a mass m2 are movably disposed on a guiding frictional member 31. A piezoelectric element 33 has one end secured adhesively to one end of the moving member 32 and the other end secured adhesively to the driving frictional member 34 with the mass m2.

The coefficient of friction in the contact plane between the moving member 32 and the guiding frictional member 31 is sufficiently low, while the coefficient of friction in the contact plane between the driving frictional member 34 and the guiding frictional member 31 is set higher than that. On the other hand, the mass m1 of the moving member 32 is larger than the mass m2 of the driving frictional member 34 (ml>m2).

Figure 5D:
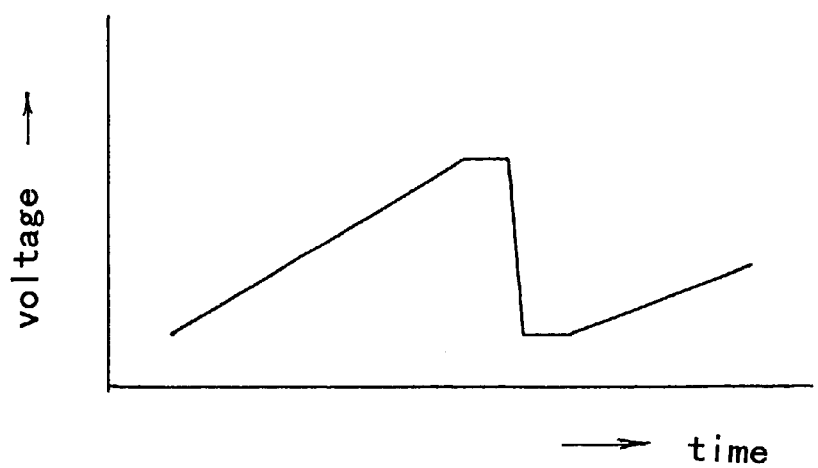

In the foregoing structure, when a drive pulse having a slow rising portion and a rapid falling portion as shown in FIG. 5D is applied to the piezoelectric element 33, the piezoelectric element 33 slowly expands with the slow rising portion of the drive pulse under low acceleration. Consequently, the moving member 32 moves to the right in the drawing (in the direction indicated by the arrow a), so that a transition is made from the state shown in FIG. 5A to the state shown in FIG. 5B.

This is because the driving frictional member 34 holds a stationary state without sliding relative to the guiding frictional member 31 since the frictional force between the driving frictional member 34 and the contact plane of the guiding frictional member 31 is larger than the inertial force resulting from the movement of the moving member 32, so that the moving member 32 moves away from the driving frictional member 34.

Then, the piezoelectric element 33 rapidly contracts with the rapid falling portion of the drive pulse under high acceleration. Consequently, the driving frictional member 34 moves to the right in the drawing (in the direction indicated by the arrow a), so that a transition is made from the state shown in FIG. 5B to the state shown in FIG. 5C.

This is because the moving member 32 does not substantially move since the inertial force of the moving member 32 is larger than the frictional force between the driving frictional member 34 and the contact plane of the guiding frictional member 31 and the mass m1 of the moving member 32 is larger than the mass m2 of the driving frictional member 34, so that the driving frictional member 34 moves closer to the moving member 32.

With the structure, the driving frictional member 34 moves along the guiding frictional member 31, which allows the stroke of the actuator to be elongated by increasing the length of the guiding frictional member 31 and achieves high-speed driving without lowering the driving speed.

Figure 6:
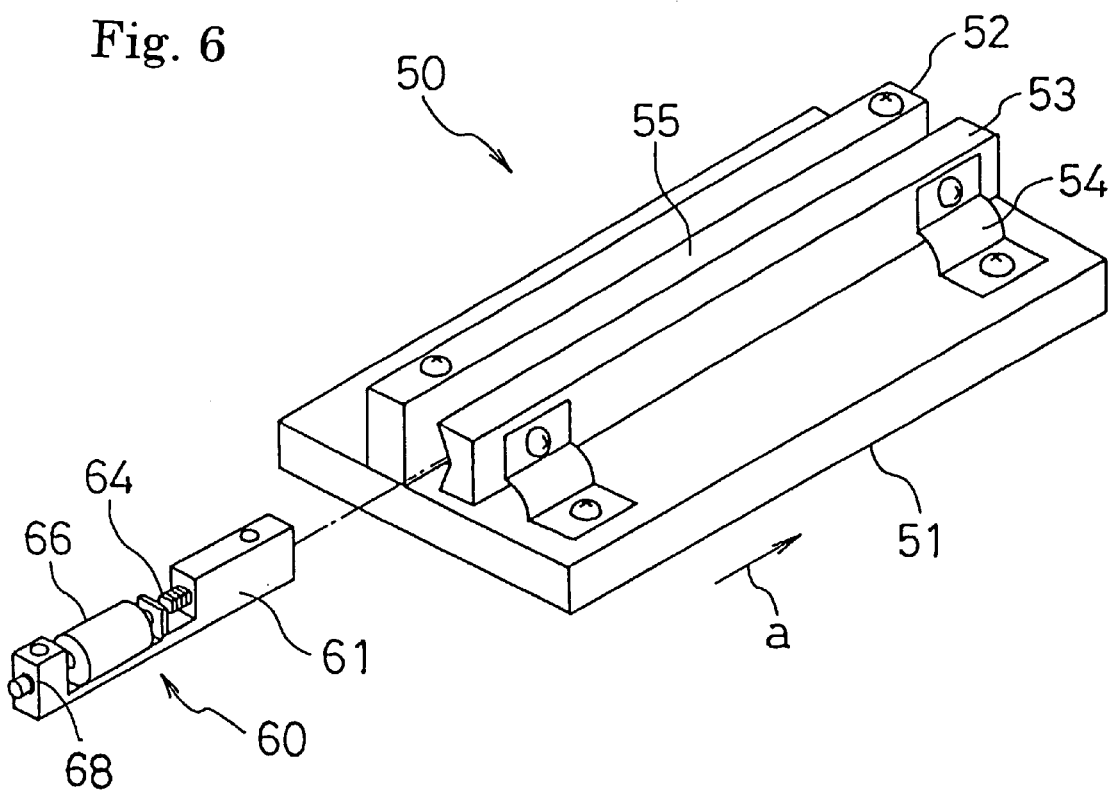
FIG. 6 is a perspective view showing a structure of an actuator according to the second embodiment.
Figure 7:
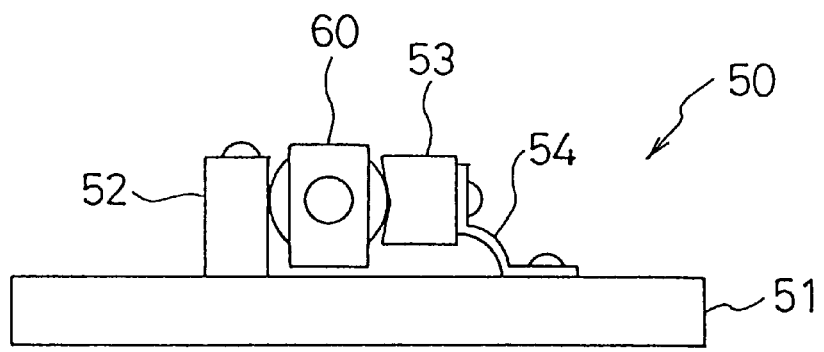
FIG. 7 is a cross-sectional view of a drive unit of the actuator shown in FIG. 6 when the drive unit is attached to a main body of the actuator.
Figure 8:
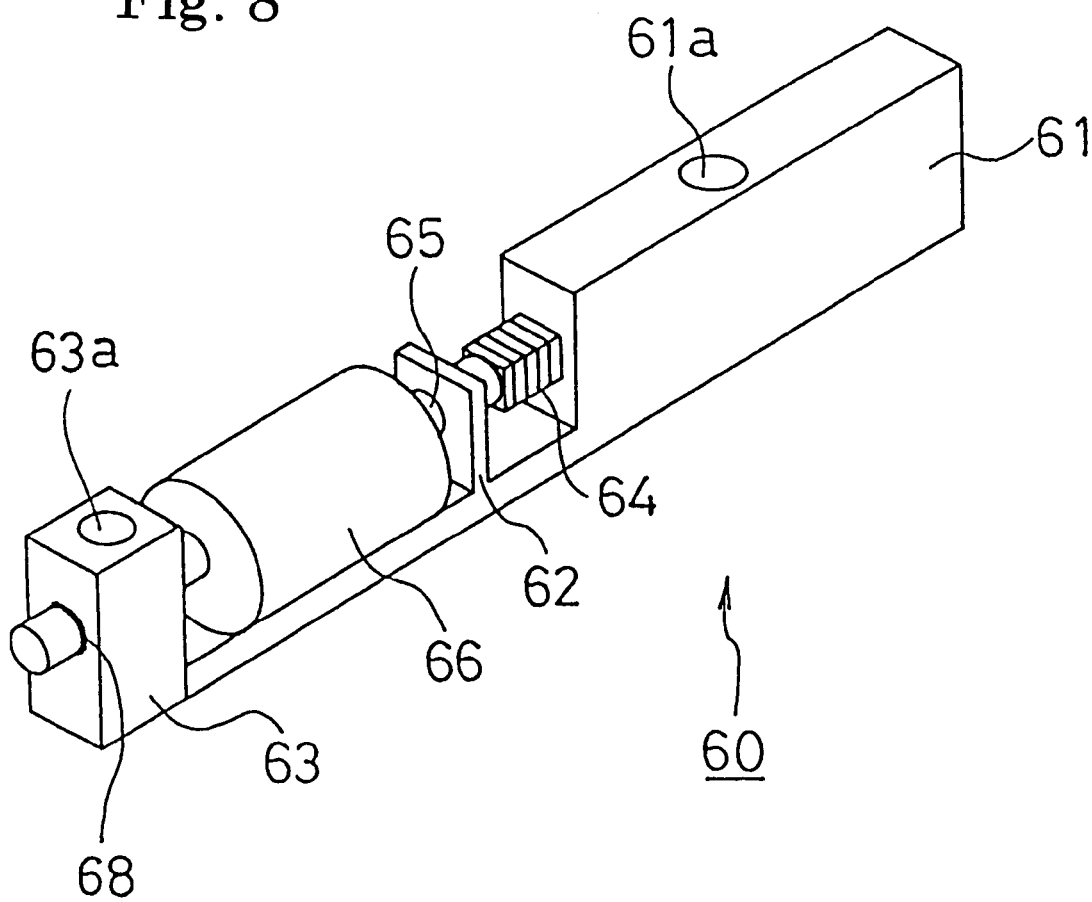
FIG. 8 is a perspective view showing a structure of the drive unit of the actuator shown in FIG. 6.

FIGS. 6 to 8 are views for illustrating the structure of the freerunning actuator according to the second embodiment. FIG. 6 is a perspective view showing the structure of the actuator 50, from which a drive unit 60 has been detached. FIG. 7 is a cross-sectional view of the actuator 50 with the drive unit 60 being attached to the main body thereof. FIG. 8 is a perspective view showing the structure of the drive unit 60.

As shown in FIG. 6, the actuator 50 consists of: a base 51; guiding members 52 and 53 composing a second member provided on the base; and the drive unit 60 disposed between the guiding members 52 and 53. The guiding member 53 is formed with a groove having a generally V-shaped cross-sectional configuration. The guiding members 52 and 53 are disposed with a given spacing 55 to hold a cylindrical member 66 of the drive unit 60 therebetween, which will be described later. The guiding member 53 is also biased by a spring 54 toward the cylindrical member 66.

As shown in FIG. 8, the drive unit 60 consists of: a frame 61; support members 62 and 63 formed integrally on the frame 61; a piezoelectric element 64; a drive shaft 65; and the cylindrical member 66. The drive shaft 65 and the cylindrical member 6 compose a first member and the cylindrical member 66. The guiding members 52 and 53 composing the second member hold the cylindrical member therebetween. The piezoelectric element 64 has one end secured adhesively to a side wall of the frame 61 composing a third member and the other end secured adhesively to the drive shaft 65 composing the first member.

The drive shaft 65 is supported by the support members 62 and 63 to be movable in the axial direction. The portion of the drive shaft 65 supported by the support member 63 is adhered with an adhesive agent 68 having viscoelasticity, e.g., an adhesive containing silicon as a main component. Due to the viscoelasticity of the adhesive agent, the drive shaft 65 and the cylindrical member 66 can axially reciprocate with the expansion or contraction of the piezoelectric element 64 in the direction of thickness. The frame 61 and the support member 63 have mounting holes 61a, 63a for securing a member to be driven not shown.

The first member composed of the drive shaft 65 and the cylindrical member 66 is formed to have a mass smaller than the mass of the frame 61 composing the third member (Mass of First Member<Mass of Third Member).

With the structure, the guiding members 52, 53 composing the second member and the cylindrical member 66 of the drive unit 60 composing the first member are frictionally coupled to each other under a proper frictional force.

It is to be noted that the frame 61 of the drive unit 60 and the support members 62 and 63 formed integrally on the frame 61 are held in a floating state without contacting the base 51, the guiding members 52 and 53, and the frame 61 but with only the cylindrical member 66 kept in contact with the supporting members 62 and 63.

Figure 11A:
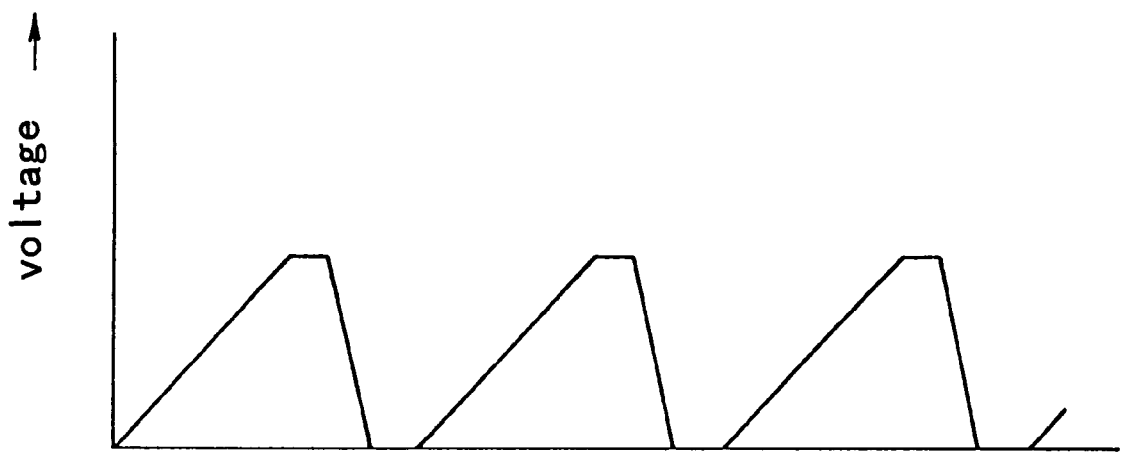
FIGS. 11A and 11B are views for illustrating the waveforms of the drive pulse.

A description will be given next to the operation. When a sawtooth wave drive pulse having a slow rising portion and a rapid falling portion, as shown in FIG. 11A, is applied to the piezoelectric element 64 with the cylindrical member 66 of the drive unit 60 being held by the guiding members 52 and 53 therebetween and frictionally coupled under the proper frictional force, the piezoelectric element 64 is displaced slowly expansively in the direction of thickness with the slow rising portion of the drive pulse. However, since the cylindrical member 66 and the guiding members 52 and 53 are frictionally coupled to each other, the cylindrical member 66 does not move relative to the guiding members 52 and 53 and the frame 61 moves in the direction indicated by the arrow a.

With the rapid falling portion of the drive pulse, the piezoelectric element 64 is displaced rapidly contractively in the direction of thickness. At this time, the inertial force of the frame 61 trying to stay in place overcomes the frictional coupling force of the cylindrical member 66 and the guide members 52 and 53, so that a slide occurs between the cylindrical member 66 and the guide members 52 and 53 and the frame 61 does not move.

Figure 11B:
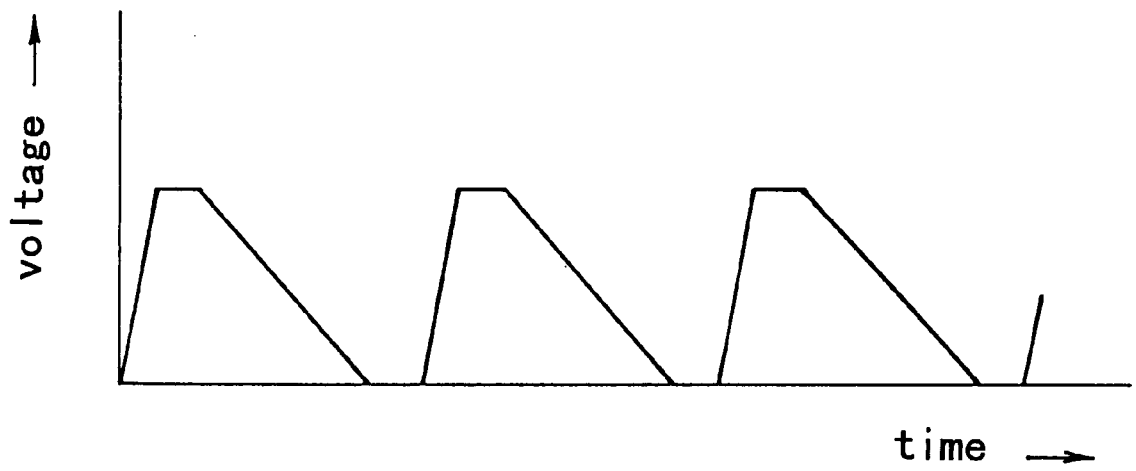

By continuously applying the drive pulse to the piezoelectric element 64, the frame 61, i.e., the drive unit 60 can be moved continuously in the direction indicated by the arrow a. To move the drive unit 60 in the direction opposite to the foregoing (direction opposite to the direction indicated by the arrow a), it is sufficient to change the waveform of the sawtooth wave drive pulse applied to the piezoelectric element 64 and apply a drive pulse consisting of a rapid rising portion and a slow falling portion, as shown in FIG. 11B.

In the actuator according to the second embodiment also, the portion of the drive shaft 65 supported by the support member 63 is attached with the adhesive agent 68 having viscoelasticity, similarly to the actuator according to the first embodiment.

Since the actuator according to the second embodiment has thus been structured, the viscoelasticity of the adhesive agent 68 at the support member 63 acts, as if as a buffer mechanism composed of a spring and a dash pot, on reciprocal vibrations at different speeds produced in the drive shaft 65 by the expansive or contractive displacement of the piezoelectric elements in the direction of thickness. As a result, undesired harmonic vibrations produced in the drive shaft 21 can also be absorbed. This achieves driving not only with a driving voltage lower than in the conventional embodiment but also driving at a high speed with a lower driving voltage. Moreover, the linearity of the driving speed with respect to the driving voltage is also improved.

As described above, the actuator using the electro-mechanical transducer according to the present invention is characterized in that the driving member or first member securely coupled to the electro-mechanical transducer and displaced together with the electro-mechanical transducer has the end portion adhered to the support member for supporting the driving member with the adhesive agent. The support member may also support the driving member via an elastic member such as silicon rubber, instead of the adhesive agent.

As a result, it becomes possible to absorb the undesired harmonic vibrations produced in the driving member or first member driven by the electro-mechanical transducer and move the member to be driven at a high speed in a specified direction. In accordance with this invention, there can be provided an actuator with excellent performance that can be driven not only with a voltage lower than in the conventional embodiment but also with the lower driving voltage at a high speed, wherein the driving speed shows excellent linearity with respect to driving voltage.

What is claimed is:

1. An actuator comprising:
   an electro-mechanical transducer;
   a fixed portion which supports one end of the electro-mechanical transducer;
   a driving member wherein one end of the drive member is fixed to the other end of the electro-mechanical transducer;
   a driven member which is frictionally coupled to the driving member;
   a support member which supports the other end of the driving member; and
   an elastic member disposed between the support member and the other end of the driving member.

2. An actuator according to claim 1, wherein said elastic member is an adhesive agent.

3. An actuator according to claim 2, wherein said adhesive agent includes silicon.

4. An actuator according to claim 1, wherein said elastic member has viscosity.

5. An actuator according to claim 1, wherein the driving member is movable in the direction of expansive or contractive displacement of the electro-mechanical transducer.

6. An actuator comprising:
   an electro-mechanical transducer;
   a first member wherein one end of the first member is fixed to one end of the electro-mechanical transducer
   a second member frictionally coupled to the first member,
   a frame having a fix portion and a support portion, wherein the fixed portion is fixed to the other end of the electro-mechanical transducer and the support portion is supporting the other end of the first member; and
   an elastic member disposed between the support portion and the other end of the first member.

7. An actuator according to claim 6, wherein said elastic member is an adhesive agent.

8. An actuator according to claim 7, wherein said adhesive agent includes silicon.

9. An actuator according to claim 6, wherein said elastic member has viscosity.

10. An actuator according to claim 6, wherein said frame is engaged with a driven member.

11. An actuator according to claim 10, wherein the frame is movable in the direction of expansive or contractive displacement of the electro-mechanical transducer.

* * * * *